United States Patent
Black et al.

(10) Patent No.: US 12,487,598 B2
(45) Date of Patent: Dec. 2, 2025

(54) SYSTEMS AND METHODS FOR RISK-BOUNDED CONTROL BARRIER FUNCTIONS

(71) Applicant: Toyota Motor Engineering & Manufacturing North America, Inc., Plano, TX (US)

(72) Inventors: Mitchell Black, Ann Arbor, MI (US); Bardh Hoxha, Canton, MI (US); Georgios Fainekos, Novi, MI (US); Tomoya Yamaguchi, Ann Arbor, MI (US); Danil V. Prokhorov, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 190 days.

(21) Appl. No.: 18/108,453

(22) Filed: Feb. 10, 2023

(65) Prior Publication Data
US 2024/0272636 A1    Aug. 15, 2024

(51) Int. Cl.
*G05D 1/02* (2020.01)
*B60W 60/00* (2020.01)
*G05D 1/00* (2006.01)

(52) U.S. Cl.
CPC ....... *G05D 1/0212* (2013.01); *B60W 60/0015* (2020.02)

(58) Field of Classification Search
CPC .............. G05D 1/0212; G05D 1/0214; B60W 60/0015; B60W 30/09; B60W 30/095; B60W 60/001; B60W 60/0011
See application file for complete search history.

(56) References Cited

U.S. PATENT DOCUMENTS

| | | | |
|---|---|---|---|
| 11,919,514 B1* | 3/2024 | Ravella | B60W 60/001 |
| 2022/0225931 A1* | 7/2022 | Bode | A61M 5/14244 |
| 2023/0020503 A1* | 1/2023 | Rahman | G05D 1/0221 |
| 2023/0035637 A1* | 2/2023 | Moshchuk | B60W 60/001 |
| 2023/0150532 A1* | 5/2023 | Hafner | B60W 30/0953 701/23 |
| 2024/0051523 A1* | 2/2024 | Srinivasan | B60W 30/09 |

(Continued)

FOREIGN PATENT DOCUMENTS

CN    113380210 A    9/2021

OTHER PUBLICATIONS

Yaghoubi et al., Risk-Bounded Control with Kalman Filtering and Stochastic Barrier Functions, 2021 (Year: 2021).*

(Continued)

*Primary Examiner* — Anne Marie Antonucci
*Assistant Examiner* — Connor L Knight
(74) *Attorney, Agent, or Firm* — Christopher G. Darrow; Darrow Mustafa PC

(57) ABSTRACT

System, methods, and other embodiments described herein relate to implementing risk-bounded control barrier functions. In one embodiment, a method includes estimating a state of a vehicle; planning a trajectory based on the state of the vehicle; determining a nominal control input based on the trajectory; applying a risk-bounded control barrier function to determine a control input; and applying the control input to the vehicle.

20 Claims, 5 Drawing Sheets

(56) References Cited

U.S. PATENT DOCUMENTS

2024/0075955 A1* 3/2024 Chen ..................... B60W 30/02

OTHER PUBLICATIONS

Clark, "Control Barrier Functionis for Stochastic Systems", Automatica, vol. 130, Aug. 2021.
Chern et al. "Safe Control in the Presence of Stochastic Uncertainties", 2021 60th IEEE Conference on Decision and Control (CDC), 2021.
Jagtap et al. "Control Barrier Functions for Unknown Nonlinear Systems using Gaussian Processes", 2020 59th IEEE Conference on Decision and Control (CDC), 2020, pp. 3699-3704.
Cheng et al. "Safe Multi-Agent Interaction through Robust Control Barrier Functions with Learned Uncertainties", 2020 59th IEEE Conference on Decision and Control (CDC), 2020.
Yaghoubi et al. "Risk-Bounded Control with Kalman Filtering and Stochastic Barrier Functions", IEEE Conference on Decision and Control, 2021.
Khojasteh et al. "Probabilistic Safety Constraints for Learned High Relative Degree System Dynamics", Proceedings of Machine Learning Research, vol. 120, 2020.
Dhiman et al. "Control Barriers in Bayesian Learning of System Dynamics", IEEE Transactions on Automatic Control, vol. 68, Issue 1, 2021.
Berger et al. "A universal model-free and safe adaptive cruise control mechanism", 23rd International Symposium on Mathematical Theory of Networks and Systems, pp. 925-932. 2018.
Berger et al. "Funnel Cruise Control", Automatica, vol. 119, Sep. 2020, 109061.
Brudigam et al. "Safe Stochastic Model Predictive Control", arXiv:2204.06207v2 [eess.SY] Sep. 2022.
Salehi et al. "Extension of Chance-Constrained System Identification of Nonlinear Discrete Systems with Safety and Stability Guarantees", arXiv:2111.07466v1 [eess.SY] Nov. 2021.

* cited by examiner

SYSTEMS AND METHODS FOR RISK-BOUNDED CONTROL BARRIER FUNCTIONS

TECHNICAL FIELD

The subject matter described herein relates, in general, to control barrier functions, and, more particularly, to implementing risk-bounded control barrier functions.

BACKGROUND

Vehicles with autonomous driving assistance features may utilize methods such as control barrier functions to try and ensure that vehicle control inputs do not result in the vehicle entering an unsafe state of operation (e.g., colliding with another vehicle). Current development of control barrier functions in a stochastic setting has leaned heavily on martingale theory for both discrete-time and continuous-time stochastic processes.

SUMMARY

In one embodiment, example systems and methods relate to a manner of implementing risk-bounded control barrier functions.

In one embodiment, a method for implementing risk-bounded control barrier functions is disclosed. In one embodiment, the method includes estimating a state of a vehicle; planning a trajectory based on the state of the vehicle; determining a nominal control input based on the trajectory; applying a risk-bounded control barrier function to determine a control input; and applying the control input to the vehicle.

In one embodiment, a risk-bounded control barrier function ("RB-CBF") system is disclosed. The RB-CBF system includes one or more processors and a memory communicably coupled to the one or more processors. The memory stores a command module including instructions that when executed by the one or more processors cause the one or more processors to estimate a state of a vehicle; plan a trajectory based on the state of the vehicle; determine a nominal control input based on the trajectory; apply a risk-bounded control barrier function to determine a control input; and apply the control input to the vehicle.

In one embodiment, a non-transitory computer-readable medium including instructions that when executed by one or more processors cause the one or more processors to perform one or more functions is disclosed. The instructions include instructions to estimate a state of a vehicle; plan a trajectory based on the state of the vehicle; determine a nominal control input based on the trajectory; apply a risk-bounded control barrier function to determine a control input; and apply the control input to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with implementing risk-bounded control barrier functions are disclosed herein. Control barrier functions known in the art, such as those based on martingale theory, typically impose constraints on vehicle control inputs that tend to significantly overestimate the actual fraction of unsafe outcomes, therefore often degrading the ability of a vehicle to achieve a planned trajectory due to substantial adjustments to the control inputs by the control barrier functions. Accordingly, a new approach involving risk-bounded control barrier functions are described herein that allows for achieving safe operation without excessive degradation of a vehicle's ability to achieve a planned trajectory.

Figure 1:
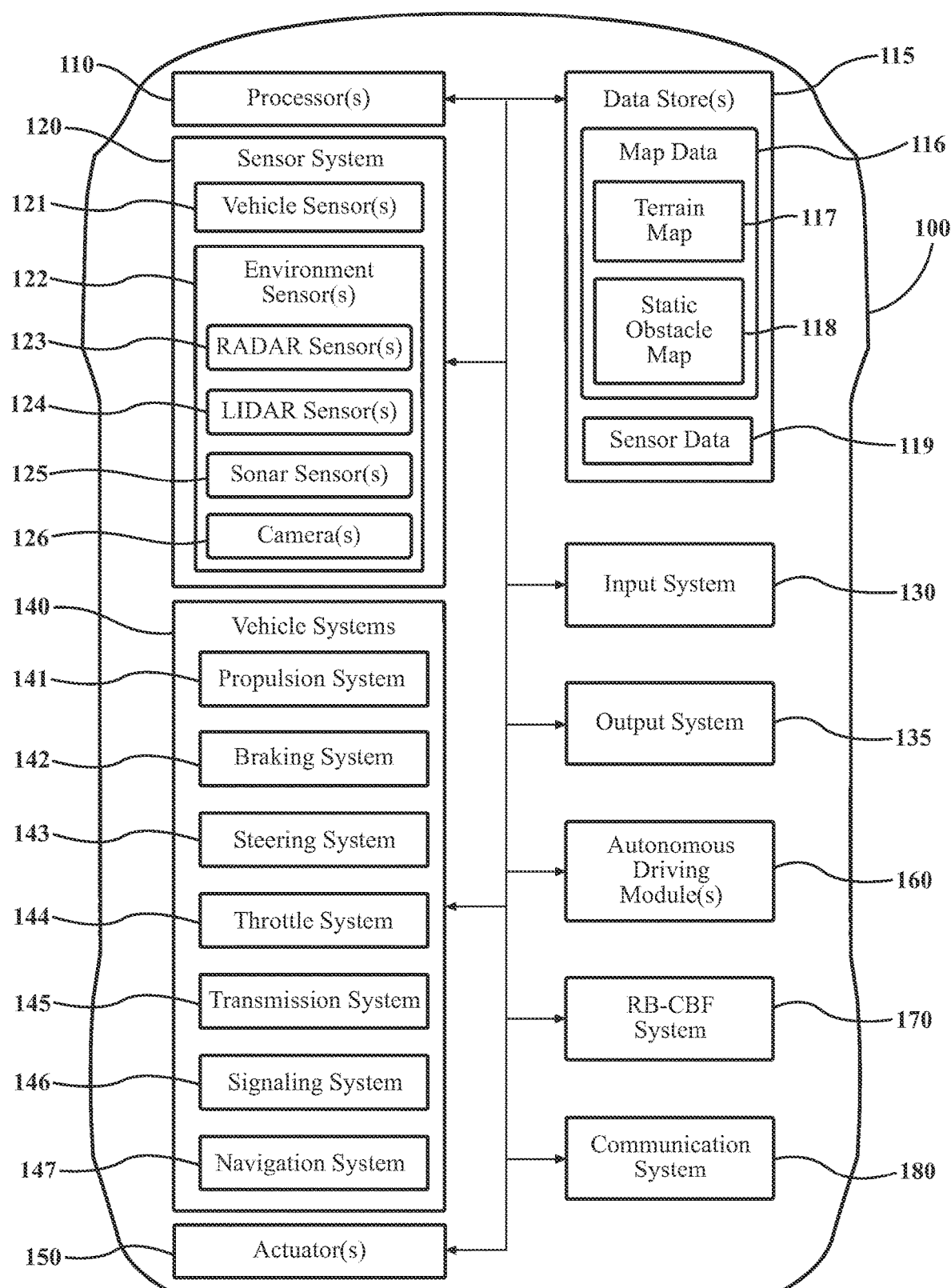
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with implementing risk-bounded control barrier functions. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an RB-CBF system 170 that is implemented to perform methods and other functions as disclosed herein relating to implementing risk-bounded control barrier functions. As will be discussed in greater detail subsequently, the RB-CBF system 170, in various embodiments, is implemented partially within the vehicle 100, and as a cloud-based service. For example, in one approach, functionality associated with at least one module of the RB-CBF system 170 is implemented within the vehicle 100 while further functionality is implemented within a cloud-based computing system.

Figure 2:
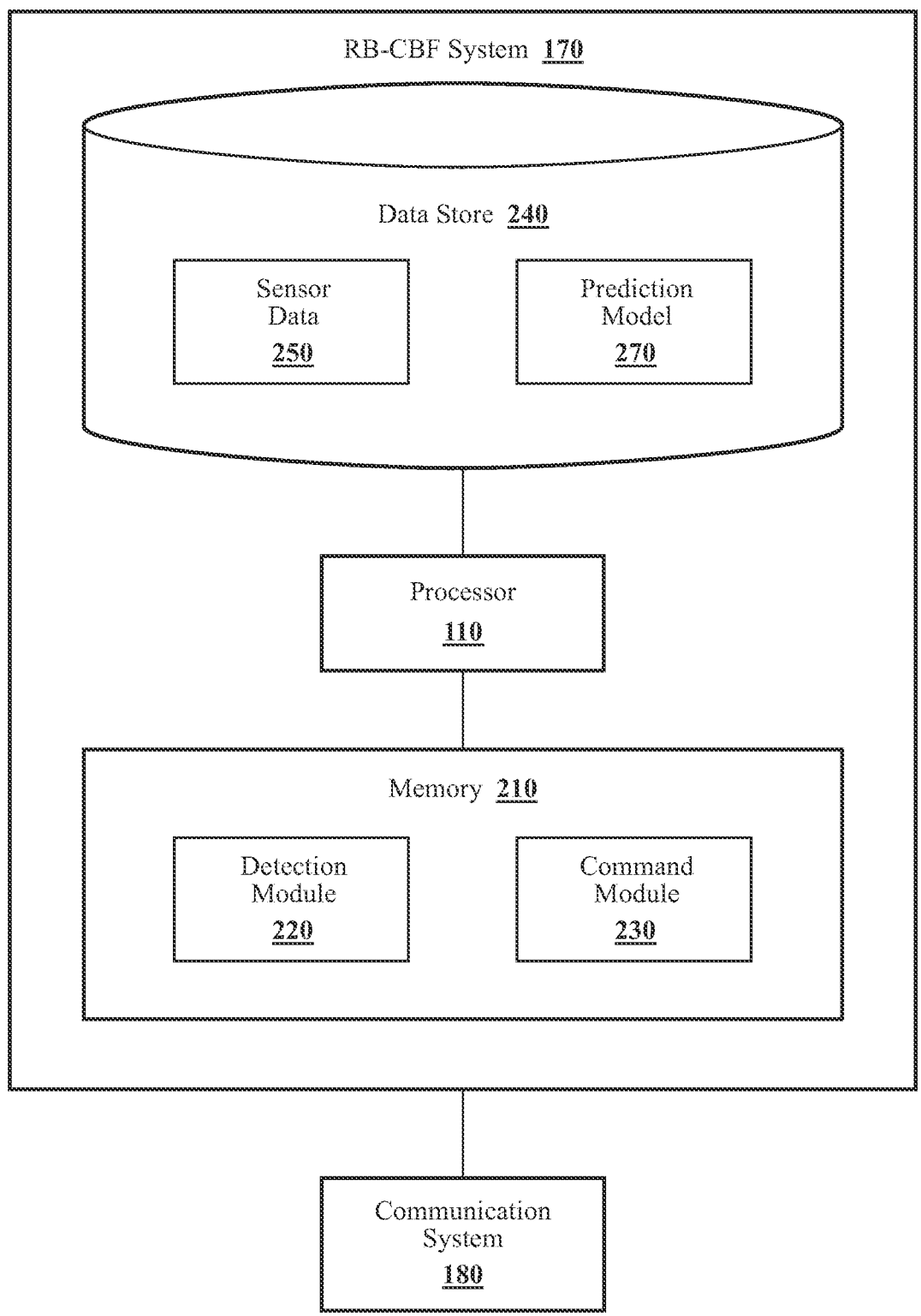
FIG. 2 illustrates one embodiment of a RB-CBF system that is associated with implementing risk-bounded control barrier functions.

With reference to FIG. 2, one embodiment of the RB-CBF system 170 of FIG. 1 is further illustrated. The RB-CBF system 170 is shown as including a processor 110 from the vehicle 100 of FIG. 1. Accordingly, the processor 110 may be a part of the RB-CBF system 170, the RB-CBF system 170 may include a separate processor from the processor 110 of the vehicle 100, or the RB-CBF system 170 may access the processor 110 through a data bus or another communication path. In one embodiment, the RB-CBF system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
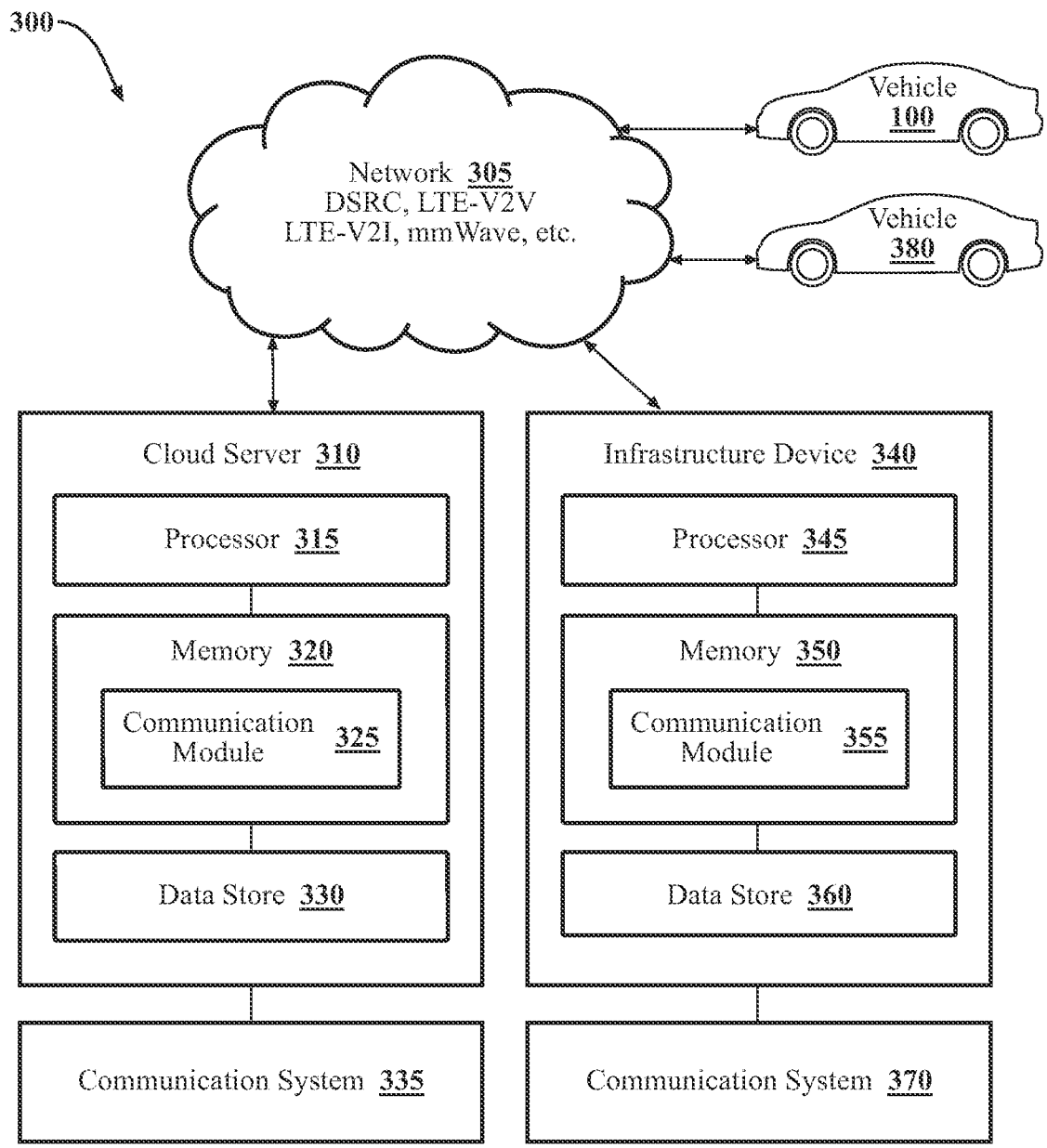
FIG. 3 illustrates one embodiment of the RB-CBF system of FIG. 2 in a cloud-computing environment.

The RB-CBF system 170 as illustrated in FIG. 2 is generally an abstracted form of the RB-CBF system 170 as may be implemented between the vehicle 100 and a cloud-computing environment. FIG. 3, which is further described below, illustrates one example of a cloud-computing environment 300 that may be implemented along with the RB-CBF system 170. As illustrated in FIG. 3, the RB-CBF system 170 may be embodied at least in part within the cloud-computing environment 300.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles. In one embodiment, detection module 220 may also acquire sensor data 250 from one or more sensors that allow for implementing risk-bounded control barrier functions.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the RB-CBF system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the command module 230 generally includes instructions that function to control the processor 110 or collection of processors in the cloud-computing environment 300 for implementing risk-bounded control barrier functions.

With regard to implementing risk-bounded control barrier functions, a class of dynamical systems may be represented by the following non-linear, control-affine, stochastic differential equation:

$$dx_t = (f(x_t) + g(x_t)u_t)dt + \sigma(x_t)dw_t, \qquad (1)$$

where $x_t$ denotes the state $x_t \in \chi \subseteq \mathbb{R}^n$, $f$ denotes a control-independent drift function $f: \mathbb{R}^n \to \mathbb{R}^n$, $g$ denotes a control-dependent drift function $g: \mathbb{R}^n \to \mathbb{R}^{n \times m}$, $u_t$ denotes the control input vector $u_t \in \mathcal{U} \mathbb{R}^m$ at time t, $\sigma$ denotes a diffusion function $\sigma: \mathbb{R}^n \to \mathbb{R}^{n \times q}$, and $w_t$ denotes a standard q-dimensional Wiener process (also known as Brownian motion) defined over the complete probability space ($\Omega$, $\mathcal{F}$, P) for sample space $\Omega$, σ-algebra $\mathcal{F}$ over $\Omega$, and probability measure P: $\mathcal{F} \to [0, 1]$.

Further, a deterministic element of the closed-loop dynamics of a class of memoryless, state-feedback controllers may be expressed as:

$$a(x_t) = f(x_t) + g(x_t)k(x_t), \qquad (2)$$

where k denotes a control signal function k: $\mathbb{R}^n \to \mathcal{U}$ and $u_t = k(x_t)$. In addition, the functions $f$, $g$, and k may be known, locally Lipschitz, and satisfy a linear growth condition on $\chi$.

In view of the above, the generator $\Gamma_B$ of a stochastic analog that characterizes the derivative of B over the trajectories of equation (1) in expectation may be expressed as:

$$\Gamma_B(x_t, u_t) = \frac{\partial B}{\partial x} f(x_t) + \frac{\partial B}{\partial x} g(x_t) u_t + \frac{1}{2} Tr\left(\sigma(x_t)^T \frac{\partial^2 B}{\partial x^2} \sigma(x_t)\right), \qquad (3)$$

where T denotes a finite time interval over which the system may operate (e.g., to achieve a goal), B denotes the constraint function described below, and Tr is the trace of a square matrix $M \in \mathbb{R}^{n \times n}$ as $Tr(M)$.

The integral of the generator $\Gamma_B$, which may be considered as representative of an integrator state in an augmented system of dimension n+1, may be expressed as:

$$I_L(t) = \int_0^t \Gamma_B(x_t, u_t) dt. \qquad (4)$$

A normalized sub-level set S of a twice continuously differentiable, positive semi-definite function B: $\mathbb{R}^n \to \mathbb{R}$ may be expressed as:

$$S = \{x \in \mathbb{R}^n : 0 \le B(x) < 1\}, \qquad (5)$$

where for some $\gamma \in [0,1]$:

$$B(x) \le \gamma, \; x \in \mathcal{X}_0, \qquad (6)$$

where $\chi_0$ denotes the set of initial states. In the deterministic setting, the set S is said to be forward-invariant if $x_o \in S \Rightarrow x_t \in S$, $\forall t \ge 0$ and in such context may be considered to denote the set of safe states for equation (1). Since in the stochastic setting there may be failure cases in which $x_t$ exits S, such that a system may be deemed to have become unsafe, a control barrier function B may be used to bound the system risk.

Accordingly, a function B may be considered a risk-bounded control barrier function defined on the set S if there exists a Lipschitz continuous function $\alpha \in \mathcal{K}_\infty$, where $\mathcal{K}_\infty$ denotes the set of extended $\mathcal{K}$ functions, such that for equation (1) the condition:

$$\inf_{u \in U} \Gamma_B(x_t, u_t) \le \alpha(h(I_L(t))), \qquad (7)$$

holds for all $x \in S$, where:

$$h(I_L(t)) = 1 - \gamma - (\sqrt{2}\eta T)\text{erf}^{-1}(1 - \rho_d) - I_L(t), \qquad (8)$$

with $I_L(t)$ given by equation (4), the tolerable system risk $$\rho_d \in \left[1 - \text{erf}\left(\frac{1-\gamma}{\sqrt{2}\eta T}\right), 1\right]$$

as a design parameter, and $$\eta = \max_{x \in S} \|L_\sigma B(x)\|,$$

$L_\sigma$ denotes the Lie derivative of the diffusion function σ.

As known in the art, one can synthesize a control barrier function via a quadratic program according to the following equations:

$$u^* = \operatorname*{argmin}_{u \in \mathcal{U}} \frac{1}{2}\|u - u_0\|^2 + \frac{1}{2}w\delta^2, \qquad (9)$$

$$Au + b + c\delta \le 0, \qquad (10)$$

where u denotes the control input vector $u_t \in \mathbb{R}^m$ at time t, $u_0$ denotes the nominal control input $u_o \in \mathbb{R}^m$, and δ is a slack variable with weight $w \ge 0$, and equation (2) represents a generic form of control barrier function constraints with b, $c \in \mathbb{R}$, $A \in \mathbb{R}^{1 \times m}$. Accordingly, if the nominal control input $u_0$ meets the requirements of equation (10) via the quadratic program, then $u_t$ will take the same value as $u_0$. If though the nominal control input $u_0$ does not meet the requirements of equation (10), then $u_t$ is chosen by the quadratic program to meet the requirements of equation (10) with the smallest deviation from $u_0$.

In order to synthesize a risk-bounded control barrier function, command module 230 may use the quadratic program by using equation (9) in conjunction with risk-bounded form of constraints in equation (7) (instead of the generic form of control barrier function constraints in equation (10)). Accordingly, if the nominal control input $u_0$ meets the requirements of equation (7) via the quadratic program, then $u_t$ will take the same value as $u_0$. If though the nominal control input $u_0$ does not meet the requirements of equation (7), then $u_t$ is chosen by the quadratic program to meet the requirements of equation (10) with the smallest deviation from $u_0$.

In some embodiments, command module 230 may contain any models for modeling the movement or other actions of vehicle 100 or other vehicles and devices (e.g., medical devices, robotic devices). For example, a unicycle model or a discrete lateral bicycle model can be provided. In some embodiments, the movement of vehicle 100 or other vehicles and devices may be modelled with differential equations or stochastic differential equations. One or more motion models may be used by command module 230 to model the motion of vehicle 100 or other vehicles and devices, which may be based on external parameters (e.g., environmental parameters), vehicle parameters, contextual parameters, or other parameters contained in sensor data 250. For example, a motion model may be implemented based on values for external parameters, including but not limited to at least one of a friction coefficient between at least one tire and the road, a gravitational constant, a road surface roughness, an external humidity, a wind vector, and an external temperature. As another example, a motion model may be implemented based on values for vehicle parameters, including but not limited to a distance a from the center of gravity (CG) to a front axle of the vehicle, a distance b from the center of gravity (CG) to a rear axle of the vehicle, a distance L from the center of the front axle to the center of the rear axle of the vehicle, a tire distance from the CG to the rear axle of the vehicle, a vehicle speed $V_x$, a vehicle yaw rate r, vehicle sideslip angle $\beta$, front steering angle $\delta$, front and rear lateral tire forces $F_{yf}$ and $F_{yr}$, front and rear longitudinal tire forces $F_{xf}$ and $F_{yr}$, a vehicle mass m, a yaw inertia $I_{zz}$, a height h of the vehicle's CG, a wheel radius R, a cornering stiffness C, a front axle cornering stiffness $C_{af}$, or a rear axle cornering stiffness $C_{ar}$. In some embodiments, models may characterize actions such as drug delivery rate, filtering or titration rate, or other actions that may be implemented by medical or robotic devices.

In some embodiments, command module 230 may perform state estimation with respect to vehicle 100 or other vehicles and devices. For example, based on modeling the movement of vehicle 100 or other vehicles and devices, command module 230 may estimate the state of each vehicle in terms of its location, velocity, acceleration, heading, or other characteristics. As another example, based on modeling of the actions of a medical or robotic device, command module 230 may estimate the state of each medical or robotic device in terms of its drug delivery rate, filtering or titration rate, or other actions. In some embodiments, command module may estimate a state in three or more dimensions (e.g., x, y, z; quaternion) or with respect to a non-Cartesian coordinate system (e.g., a polar coordinate system). In some embodiments, command module 230 may use extended Kalman filtering in performing state estimation.

In some embodiments, command module 230 may plan a trajectory for vehicle 100 or other vehicles and devices. In some embodiments, command module 230 may plan a trajectory based on start-to-goal motion planning. In some embodiments, command module 230 may plan a trajectory based on obstacles, features, landmarks, road signs, traffic controls, lane markings or other road boundary indicators, weather conditions, traffic conditions, or other characteristics. In some embodiments, command module 230 may plan a trajectory based on the characteristics relevant to an industrial or medical environment, such as build surface, tissue damage, etc. In some embodiments, command module 230 may rely on automated driving assistance via automated driving module(s) 160 to determine a trajectory for vehicle 100 or other vehicles and devices.

In some embodiments, command module 230 may generate nominal control inputs for vehicle 100 or other vehicles and devices based on a trajectory. For example, command module 230 based on a trajectory may generate nominal control inputs in terms of steering angle, acceleration, braking, and so on. As another example, command module 230 based on a trajectory may generate nominal control inputs actuating one or more actuators of a medical or robotic device.

In some embodiments, command module 230 may apply a risk-bounded control barrier function to the nominal control inputs. For example, a control-independent drift function $f$, a control-dependent drift function g, a diffusion function $\sigma$, and a constraint function $\beta$ may be selected by command module 230 (or may be pre-determined). These functions may then be used with a measured or estimated value of $x_t$ and the nominal control input $u_0$ or computed value of $u_t$ (from a quadratic program) to obtain $I_L(t)$ via equation (4).

Next, initial condition bound $\gamma$, the function $\alpha$, the finite time interval T, and tolerable system risk $\rho_a$ may be selected by command module 230 (or may be pre-determined). Further, the value of $\eta$ may be computed by command module 230. Based on these terms, command module 230 may then obtain $h(I_L(t))$ via equation (8) and then use $h(I_L(t))$ in terms of equation (7) as a constraint for equation (9) to obtain a value of $u_t$ via a quadratic program given a nominal control input $u_0$.

For example, command module 230 may determine a nominal control input $u_0$ based on a trajectory. If the nominal control input $u_0$ meets the requirements of the risk-bounded control function via the quadratic program, then $u_t$ may take the same value as $u_0$. If though the nominal control input $u_0$ does not meet the requirements of the risk-bounded control function, then $u_t$ may be chosen by the quadratic program to meet the requirements of the risk-bounded control function with the smallest deviation from $u_0$. In this manner, the requirements of the risk-bounded control function may establish a safety requirement on $u_t$.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

The cloud server 310 is shown as including a processor 315 that may be a part of the RB-CBF system 170 through network 305 via communication system 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the RB-CBF system 170 through network 305 via communication system 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on.

Accordingly, in addition to information obtained from sensor data 250, RB-CBF system 170 may obtain information from cloud servers (e.g., cloud server 310), infrastructure devices (e.g., infrastructure device 340), other vehicles (e.g., vehicle 380), and any other systems connected to network 305. For example, command module 230 may receive external parameters (e.g., environmental parameters), vehicle parameters, contextual parameters, or other parameters via network 305. As another example, command module 230 may receive additional information, such as state estimations, trajectories, control inputs, and so on, such as for instance as they relate to other vehicles and devices, via network 305.

It should be appreciated that the command module 230 in combination with a prediction model 270 can form a computational model such as a machine learning logic, deep learning logic, a neural network model, or another similar approach. In one embodiment, the prediction model 270 is a statistical model such as a regression model that determines estimates of the state of a vehicle based on sensor data 250, map data 116, or other sources of information as described herein. Accordingly, the model 270 can be a polynomial regression (e.g., least weighted polynomial regression), least squares or another suitable approach.

Moreover, in alternative arrangements, the prediction model 270 is a probabilistic approach such as a hidden Markov model. In either case, the command module 230, when implemented as a neural network model or another model, in one embodiment, electronically accepts the sensor data 250 as an input, which may also include evaluation metrics. Accordingly, the command module 230 in concert with the prediction model 270 produce various determinations/assessments as an electronic output that characterizes the noted aspect as, for example, a single electronic value. Moreover, in further aspects, the RB-CBF system 170 can collect the noted data, log responses, and use the data and responses to subsequently further train the model 270.

Figure 4:
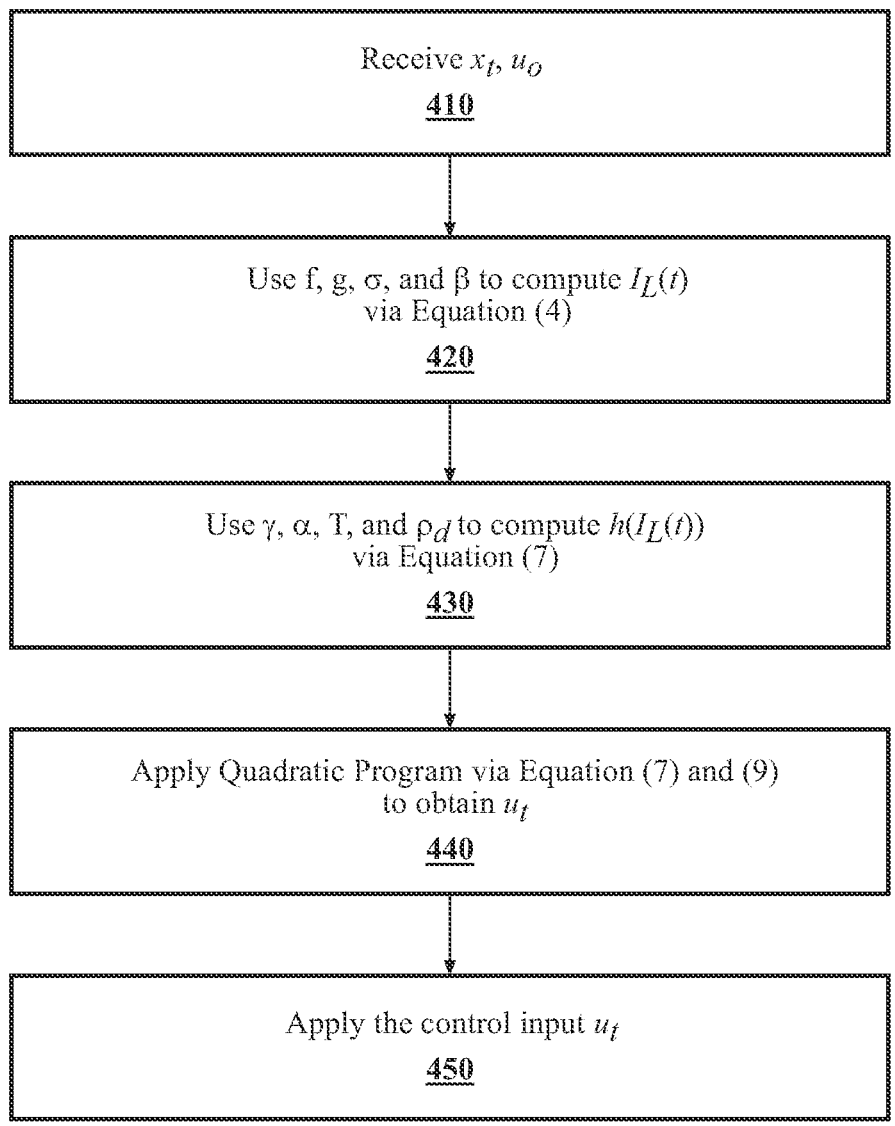
FIG. 4 illustrates one embodiment of a method for using an RB-CBF system for implementing risk-bounded control barrier functions.

Additional aspects of implementing risk-bounded control barrier functions will be discussed in relation to FIG. 4. FIG. 4 illustrates a flowchart of a method 400 that is associated with implementing risk-bounded control barrier functions. Method 400 will be discussed from the perspective of the RB-CBF system 170 of FIGS. 1 and 2. While method 400 is discussed in combination with the RB-CBF system 170, it should be appreciated that the method 400 is not limited to being implemented within the RB-CBF system 170 but is instead one example of a system that may implement the method 400.

At 410, command module 230 may receive a measured or estimated value of $x_t$ and the nominal control input $u_0$, such as through performing state estimation and trajectory planning.

At 420, command module 230 may use a control-independent drift function $f$, a control-dependent drift function $g$, a diffusion function $\sigma$, and a constraint function $\beta$ to compute $I_L(t)$ via equation (4).

At 430, command module 230 may use an initial condition bound $\gamma$, a function $\alpha$, a finite time interval T, a tolerable system risk $\rho_d$, and a value of $\eta$ to compute $h(I_L(t))$ via equation (8).

At 440, command module 230 may use the results of step 420 and step 430 in conjunction with a quadratic program to obtain $u_t$. If the nominal control input $u_0$ meets the requirements of the risk-bounded control function via the quadratic program, then $u_t$ may take the same value as $u_0$. If though the nominal control input $u_0$ does not meet the requirements of the risk-bounded control function, then $u_t$ may be chosen by the quadratic program to meet the requirements of the risk-bounded control function with the smallest deviation from $u_0$. As part of the quadratic program, the results of step 420 and 430 may be updated as the quadratic program adjusts the value of control input $u_t$ should it need to deviate from $u_0$.

At 450, command module 230 may apply the control input $u_t$ (e.g., to vehicle 100 or other vehicles and devices). In some embodiments, command module 230 may apply the control input by sending an instruction to a vehicle, device, or a mechanical system component therein to implement the control input $u_t$.

Figure 5:
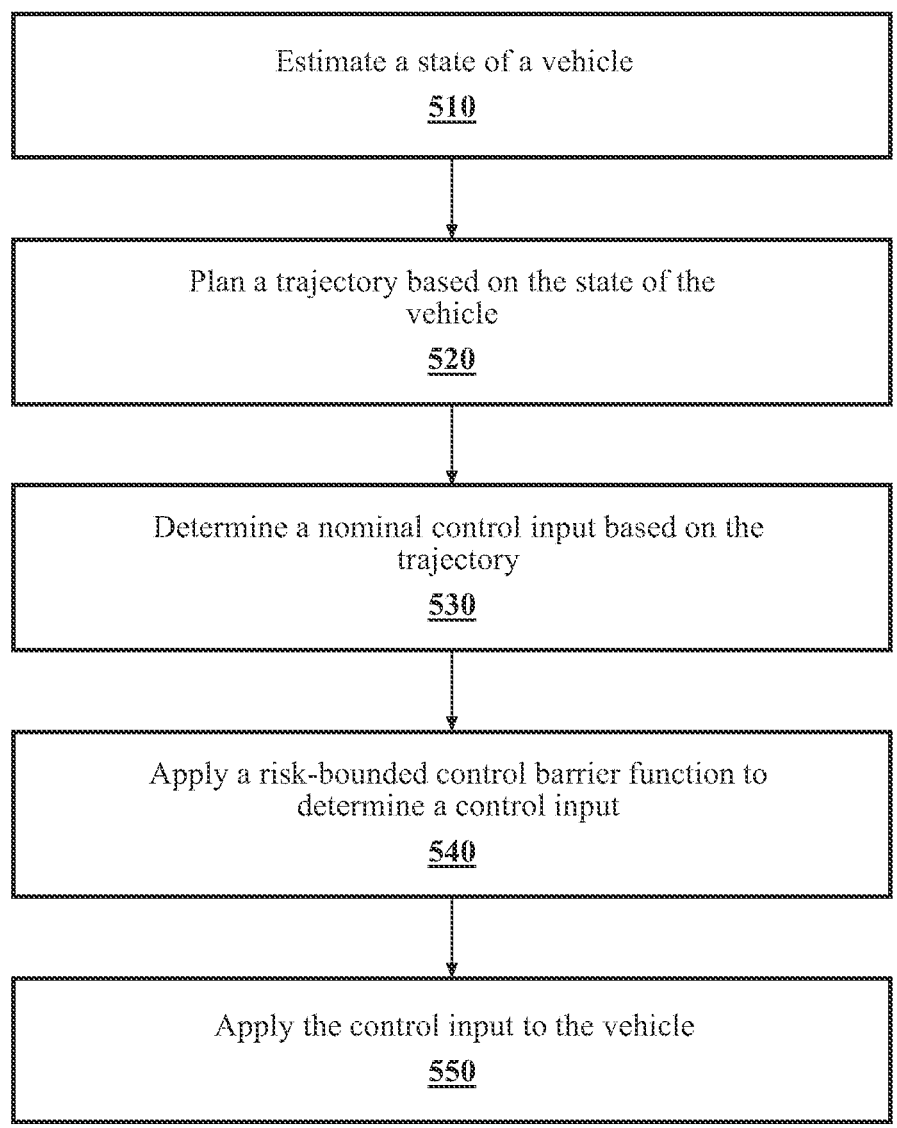
FIG. 5 illustrates one embodiment of a method for using an RB-CBF system for implementing risk-bounded control barrier functions with a vehicle system or device.

Additional aspects of implementing risk-bounded control barrier functions will be discussed in relation to FIG. 5. FIG. 5 illustrates a flowchart of a method 500 that is associated with implementing risk-bounded control barrier functions. Method 500 will be discussed from the perspective of the RB-CBF system 170 of FIGS. 1 and 2. While method 500 is discussed in combination with the RB-CBF system 170, it should be appreciated that the method 500 is not limited to being implemented within the RB-CBF system 170 but is instead one example of a system that may implement the method 500.

At 510, command module 230 may estimate the state of a vehicle. For example, command module 230 may estimate the state of a vehicle based on modelling the movement or other actions of the vehicle. In some embodiments, command module 230 may estimate the state of each vehicle in terms of its location, velocity, acceleration, heading, or other characteristics. As another example, based on modeling of the actions of a medical or robotic device, command module 230 may estimate the state of each medical or robotic device in terms of its drug delivery rate, filtering or titration rate, or other actions. In some embodiments, command module may estimate a state in three or more dimensions (e.g., x, y, z; quaternion) or with respect to a non-Cartesian coordinate system (e.g., polar coordinate system). In some embodiments, command module 230 may use extended Kalman filtering in performing state estimation.

At 520, command module 230 may plan a trajectory based on the state of the vehicle. For example, command module 230 may plan a trajectory based on start-to-goal motion planning. In some embodiments, command module 230 may plan a trajectory based on obstacles, features, landmarks, road signs, traffic controls, lane markings or other road boundary indicators, weather conditions, traffic conditions, or other characteristics. In some embodiments, command module 230 may plan a trajectory based on the characteristics relevant to an industrial or medical environment, such as build surface, tissue damage, etc. In some embodiments, command module 230 may rely on automated driving assistance via automated driving module(s) 160 to determine a trajectory for vehicle 100 or other vehicles and devices.

At 530, command module 230 may determine a nominal control input based on the trajectory. For example, command module 230 based on a trajectory may generate nominal control inputs in terms of steering angle, acceleration, braking, and so on. As another example, command module 230 based on a trajectory may generate nominal control inputs actuating one or more actuators of a medical or robotic device. In some embodiments, command module 230 may rely on automated driving assistance via automated driving module(s) 160 to determine a nominal control input based on the trajectory.

At 540, command module 230 may apply a risk-bounded control barrier function to determine a control input. For example, command module may use method 400 as described herein to apply a risk-bounded control barrier function to determine a control input.

At 550, command module 230 may apply the control input to the vehicle. In some embodiments, command module 230 may apply the control input by sending an instruction to a vehicle, device, or a mechanical system component therein to implement the control input $u_t$.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the RB-CBF system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the RB-CBF system 170, and/or the automated driving module(s) 160 may control some or all of these vehicle systems 140 and, thus, may be partially or fully autonomous.

The processor(s) 110, the RB-CBF system 170, and/or the automated driving module(s) 160 can be operatively connected to communicate with the various vehicle systems 140 and/or individual components thereof. For example, returning to FIG. 1, the processor(s) 110, the RB-CBF system 170, and/or the automated driving module(s) 160 can be in communication to send and/or receive information from the various vehicle systems 140 to control the movement, speed, maneuvering, heading, direction, etc. of the vehicle 100. The processor(s) 110, the RB-CBF system 170, and/or the automated driving module(s) 160 may control some or all of these vehicle systems 140.

The processor(s) 110, the RB-CBF system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the RB-CBF system 170, and/or the automated driving module(s) 160 can control the direction and/or speed of the vehicle 100. The processor(s) 110, the RB-CBF system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include communication system 180. Communication system 180 can be any element or combination of elements operable to communicate data to or from vehicle 100, such as may occur by communication with other vehicles (e.g., sharing of sensor data), a network (e.g., a cloud network), or as otherwise described herein.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the RB-CBF system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
estimate a state of a vehicle;
plan a trajectory based on the state of the vehicle;
determine a nominal control input based on the trajectory;
apply a risk-bounded control barrier function based on a Lipschitz continuous function a selected with respect to a stochastic analog generator and a function modifying an integral of the stochastic analog generator to determine a control input; and
execute the control input on the vehicle.

2. The system of claim 1, wherein the machine-readable instruction to plan the trajectory is further based on start-to-goal motion planning.

3. The system of claim 2, wherein the vehicle is a robotic or medical device.

4. The system of claim 3, wherein the state of the vehicle is at least one of a delivery rate, a filtering, or a titration rate.

5. The system of claim 2, wherein the state of the vehicle is at least one of a location, heading, or velocity.

6. The system of claim 1, wherein the machine-readable instruction to apply a risk-bounded control barrier function further includes modifying the integral of the stochastic analog generator based on a tolerable system risk parameter.

7. The system of claim 6, wherein the tolerable system risk parameter is bounded in relation to a Gauss error function.

8. The system of claim 1, wherein the machine-readable instruction to determine the nominal control input based on the trajectory is performed via automated driving assistance.

9. A non-transitory computer-readable medium including instructions that when executed by one or more processors cause the one or more processors to:
estimate a state of a vehicle;
plan a trajectory based on the state of the vehicle;
determine a nominal control input based on the trajectory;
apply a risk-bounded control barrier function based on a Lipschitz continuous function α selected with respect to a stochastic analog generator and a function modifying an integral of the stochastic analog generator to determine a control input; and
execute the control input on the vehicle.

10. The non-transitory computer-readable medium of claim 9, wherein the instruction to plan the trajectory is further based on start-to-goal motion planning.

11. The non-transitory computer-readable medium of claim 10, wherein the state of the vehicle is at least one of a delivery rate, a filtering, or a titration rate.

12. The non-transitory computer-readable medium of claim 10, wherein the state of the vehicle is at least one of a location, heading, or velocity.

13. The non-transitory computer-readable medium of claim 9, wherein the instruction to apply a risk-bounded control barrier function further includes modifying the integral of the stochastic analog generator based on a tolerable system risk parameter.

14. The non-transitory computer-readable medium of claim 13, wherein the tolerable system risk parameter is bounded in relation to a Gauss error function.

15. The non-transitory computer-readable medium of claim 9, wherein the instruction to determine the nominal control input based on the trajectory is performed via automated driving assistance.

16. A method, comprising:
estimating a state of a vehicle;
planning a trajectory based on the state of the vehicle;
determining a nominal control input based on the trajectory;
applying a risk-bounded control barrier function based on a Lipschitz continuous function a selected with respect to a stochastic analog generator and a function modifying an integral of the stochastic analog generator to determine a control input; and
executing the control input on the vehicle.

17. The method of claim 16, wherein planning the trajectory is further based on start-to-goal motion planning.

18. The method of claim 16, wherein applying a risk-bounded control barrier function further includes modifying the integral of the stochastic analog generator based on a tolerable system risk parameter.

19. The method of claim 18, wherein the tolerable system risk parameter is bounded in relation to a Gauss error function.

20. The method of claim 16, wherein determining the nominal control input based on the trajectory is performed via automated driving assistance.

* * * * *